United States Patent [19]

Hill

[11] Patent Number: 4,516,903
[45] Date of Patent: May 14, 1985

[54] ELEVATOR POSITION-CONTROL MECHANISM FOR ROTATABLE FORAGE CONTAINER

[75] Inventor: Amos G. Hill, Hesston, Kans.

[73] Assignee: Hesston Corporation, Hesston, Kans.

[21] Appl. No.: 466,974

[22] Filed: Feb. 16, 1983

[51] Int. Cl.³ ............................................ A01D 90/00
[52] U.S. Cl. ..................................... 414/491; 414/505
[58] Field of Search ............... 414/476, 489, 491, 505, 414/523, 470; 298/18; 56/16.6, 16.4

[56] References Cited

U.S. PATENT DOCUMENTS

| | | | |
|---|---|---|---|
| 1,182,643 | 5/1916 | Clark | 298/18 X |
| 1,813,570 | 7/1931 | Flowers | 298/18 |
| 2,072,998 | 5/1935 | Allin | 298/18 |
| 2,862,342 | 12/1958 | Fergason | 56/16.6 X |
| 3,066,817 | 12/1962 | Bradshaw et al. | 414/505 |
| 3,125,345 | 3/1964 | Ellis | 414/489 X |

Primary Examiner—Robert J. Spar
Assistant Examiner—David A. Bucci
Attorney, Agent, or Firm—Schmidt, Johnson, Hovey & Williams

[57] ABSTRACT

The forage receiving container box of a crop transporting vehicle is tiltable between a stowed position and a tilted operating position, and includes an unloading elevator spout that is shiftable by a position-control mechanism between stowed and extended positions simultaneously with the shifting of the container box from its stowed to tilted position. Tilting of the container box is accomplished by a first piston and cylinder assembly, and the motion imparted by the first piston and cylinder assembly is transmitted to the elevator by a normally retracted, second piston and cylinder assembly acting in the nature of a rigid link. Additionally, the second piston and cylinder assembly may be extended independently of the first assembly for lowering of the elevator independently of the position of the crop container box. A lost-motion slide connection joins the second assembly with the elevator to takeup motion of the container in the event the elevator is already lowered when the container is rotated between its positions.

9 Claims, 7 Drawing Figures

ELEVATOR POSITION-CONTROL MECHANISM FOR ROTATABLE FORAGE CONTAINER

TECHNICAL FIELD

This invention relates to the field of transporting and handling harvested crop materials, and, more particularly, to an elevator position-control mechanism for a self-unloading hopper box for forage materials and the like which includes a retractable elevator.

BACKGROUND ART

During the harvesting of forage material it is common practice to drive a truck or wagon alongside of the harvester for the purpose of periodically filling the truck with materials that have been accumulated by the harvester during the truck's absence to discharge its load. It is desirable for the harvester to have a large transporting box associated with it so that the harvester may be operated, and forage materials accumulated within the harvester, while the truck is absent. High capacity, self-unloading forage hoppers have been disclosed in U.S. Pat. application Ser. Nos. 06/354,938 and 06/354,906, owned by the assignee of the present invention, that maximize the space of the container box while enabling the harvester to meet governmental height and width restrictions with respect to vehicles which at least periodically utilize public roads. These previously disclosed harvesters have included a tiltable container box and a retractable elevator for emptying the contents of the container box. It would be desirable, however, to provide a tiltable crop container box having a retractable elevator with an elevator control mechanism that would automatically position the elevator to its fully extended position simultaneously with the tilting of the container box to its operating position. Moreover, it would be desirable for such a position control mechanism to permit positioning of the elevator to its fully extended position independently of the position of the container box so that crop material could be discharged from the elevator mechanism at different heights to accommodate unloading of crop material to different sized trucks without regard to the position of the container.

SUMMARY OF THE PRESENT INVENTION

Accordingly, one important object of the present invention is to provide a self-unloading, crop transporting hopper box vehicle with an elevator position-control mechanism that shifts the elevator mechanism between its stowed and fully extended positions simultaneously with the shifting of the container box between its stowed and tilted positions. Moreover, the position-control mechanism hereof includes structure for shifting the elevator mechanism to its fully extended position independently of the position of the container box.

A position-control mechanism in accordance with the present invention preferably includes a first extensible piston and cylinder assembly connected between the crop container box and at least one of the linkages pivotally mounting the container box to the mobile frame of the harvester. A second, normally retracted, piston and cylinder assembly interconnects the elevator with the linkage to which the first piston and cylinder assembly is connected. Extension of the first piston and cylinder assembly shifts the container box from its normally stowed to its tilted position, and at the same time, the motion of the first assembly is transmitted through the normally retracted second assembly to the elevator, for extension of the elevator. Alternatively, the second piston and cylinder assembly may be operated independently of the first assembly for extending the elevator. The second assembly is connected to the elevator by a shiftable slide, such that the first assembly may be extended independently of the configuration of the second assembly.

DETAILED DESCRIPTION

Figure 1:
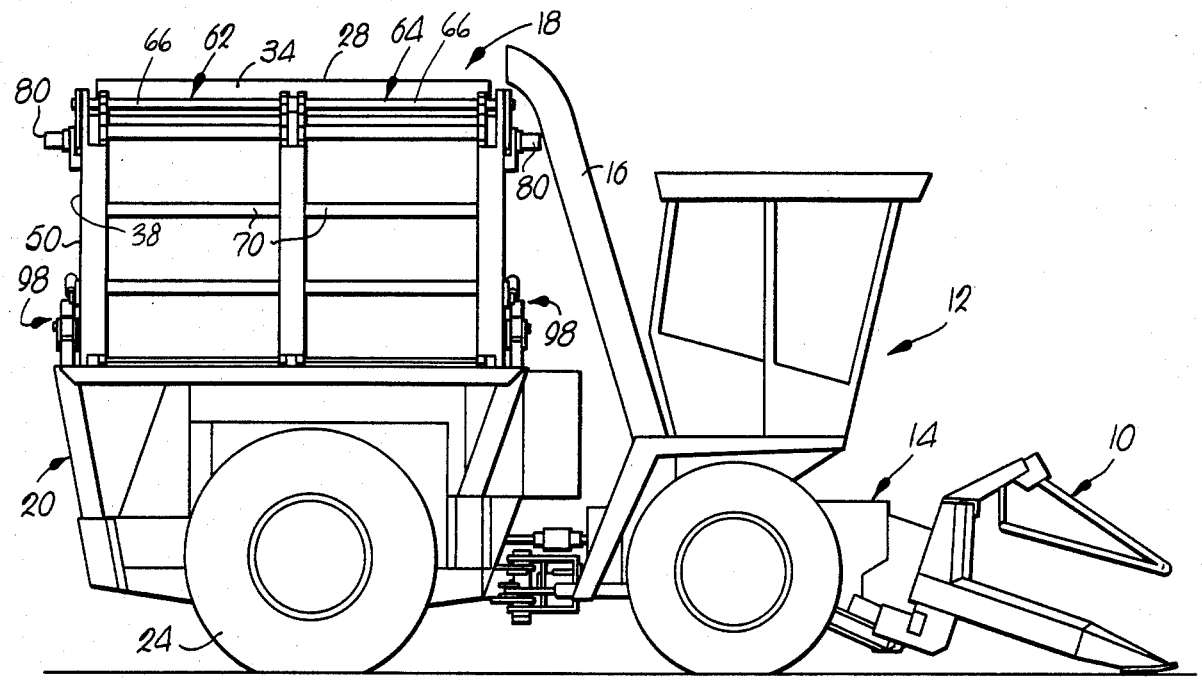
FIG. 1 is a side elevational view of forage harvesting equipment employing a tiltable crop container box having an elevator position-control mechanism in accordance with the present invention thereon.

FIG. 1 illustrates a typical example of how the construction of the present invention may be incorporated into a harvester, the particular arrangement illustrated being a self-propelled harvester having a harvesting header 10 carried on the front portion 12 of the harvester, a chopper box 14 situated rearwardly of the header 10 for receiving crop materials therefrom and for reducing the crop stalks into small segments, a blower having a rearwardly directed discharge spout 16 for propelling the crop segments rearwardly, and, a hopper box 18 for receiving materials from the spout 16 and mounted upon a mobile, rear frame portion 20 of the harvester. The frame 20 includes an upper, horizontally disposed box frame 22 located above the two rear ground wheels 24 of the harvester, the box frame 22 having its lateral extremities substantially coinciding with the lateral extremities of the wheels 24.

The box 18 includes a top 28, a bottom 30, and four sides 32, 34, 36 and 38 extending between the top 28 and the bottom 30. The front side 32 is provided with an elongated entry opening 40 located adjacent to and just beneath the top 28 and extending substantially across the entire front side 32 for the purpose of admitting crop materials from the blower spout 16 into the box 18.

The side 34 of the box 18 has an exit opening 42 located adjacent its lower extremity which extends substantially the full width of the side 34 to provide a crop discharge. A generally transversely U-shaped unloading elevator spout 44 is open at its two opposite ends and is pivoted at its inner end by hinges 46 to the box 18 below and on opposite sides of the exit opening 42. Front and rear side panels 48 and 50 respectively of the spout 44 completely cover the exit opening 42 so as to effectively form a portion of the side of the box 18 corresponding to side 34. The inwardly directed face of the panel includes a stop 51 for positioning the spout 44 in its extended position.

When the spout 44 is lowered, the floor 56 thereof is aligned with and serves as an extension of the floor 58 associated with the bottom 30 of box 18, providing the box with an unloading elevator. A conveyor 60 extends along the two floors 56, 58 and comprises two independently operable, side-by-side chain and slat assemblies broadly denoted by the numerals 62 and 64 respectively. Each of the assemblies 62, 64 has a transverse drive shaft 66 at its outer end. A pair of chains 68 are associated with each assembly 62, 64, and a series of slats 70 span each pair of chains. The drive shafts 66 of the two assemblies 62, 64 are not interconnected. Each of the drive shafts 66 is powered by its own selectively operable hydraulic motor 80 (mounted on the panels 48 and 50 respectively) which are operably coupled with shafts 66 via chain and sprocket drives 82. Rotation of the shafts 66 when in operation is in a counter-clockwise direction viewing FIG. 2 such that the slats 70 progress outwardly toward the outer end of the spout 44.

Figure 7:
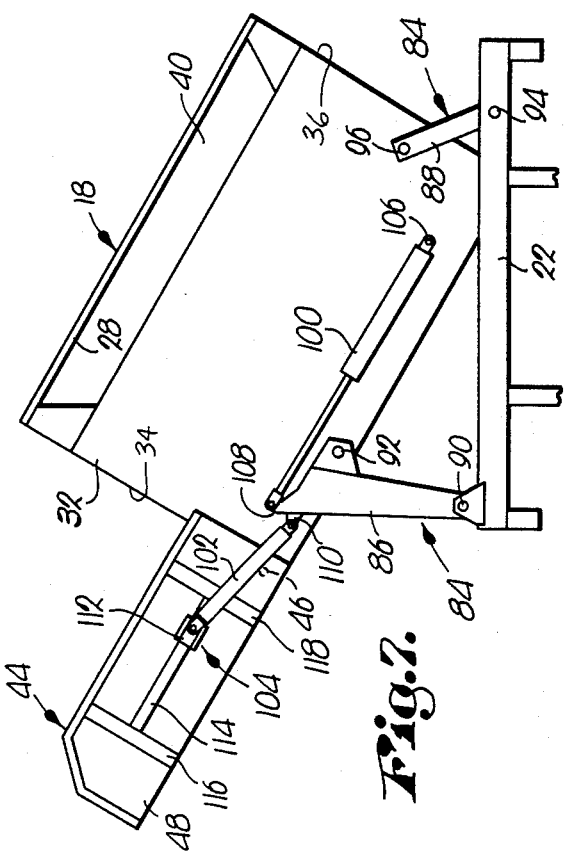
FIG. 7 is similar to FIG. 6 but with the box fully tilted.
Figure 3:
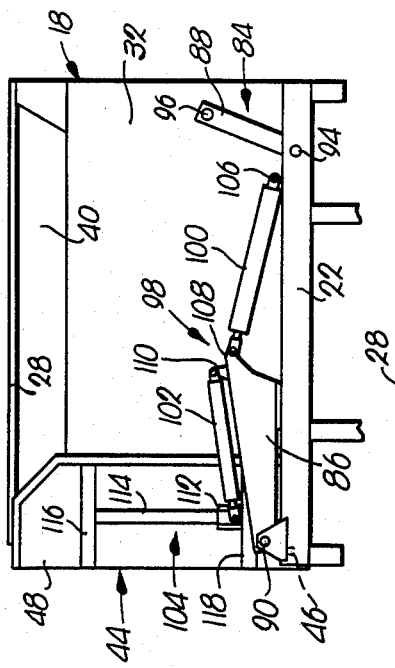
FIG. 3 is a front elevational view of the box similar to FIG. 2 but with the box in its compacted, squared-up position for over-the-road travel.

The box 18 is mounted on the upper box frame 22 of rear frame portion 20 by a four bar linkage means 84 that enables the box 18 to be alternately positionable in either a squared up, over-the-road, transport positon as illustrated in FIG. 3 or a laterally tilted, upwardly inclined positon as shown in FIG. 7 to facilitate field operations, including on-the-go loading, collecting, and unloading. When the box 18 is in its position of FIG. 3, the lateral sides 34 and 38 thereof are substantially vertically aligned with the outboard extremities of the ground wheels 24, whereas in FIG. 3 it will be noted that portions of the tilted box 18 project beyond such extremeties, and the overall height of the unit is increased as a result of the tilted orientation thereof. However, even though the box 18 is oriented in its tilted position in FIG. 7, it will be noted that the center of gravity thereof stays substantially midway between the two ground wheels 24 to thereby maintain stability of the vehicle during field operations in the tilted condition. This is achieved by virtue of the nature of the linkage 84 which enables the box 18 to effect a generally rotative type movement or motion during its change in attitude from the squared up position to the tilted position thereof, such motion being generally about an axis located inboard of the opposite lateral extremities of the box 18 and between the top 28 and bottom 30 thereof.

The linkage means 84 is a skewed arrangement in order to produce the desired rotational reorientation without substantial shifting of the center of gravity. To this end, the linkage means 84 includes a pair of links 86 and 88 on each of the front and back of the vehicle, each link 86 being pivoted at point 90 at one of its ends to the adjacent end of the box frame 22 and being pivoted at point 92 adjacent its opposite end to the box 18 adjacent the bottom 30 thereof and at a location spaced inboard from the side 34 thereof. On the other hand, each link 88 is shorter than its partner link 86, is pivoted at point 94 to the box frame 22 adjacent the opposite lateral end thereof, and, at its opposite end, is pivoted at point 96 to the box 18 at a location spaced above the bottom 30 on the front side 32. Thus, it will be seen that when the box 18 is in its squared-up position shown in FIG. 3, the point 96 is spaced considerably above the point 92.

Position-control mechanisms 98 are located both on the front wall and the rear wall of the container box 18, and each includes a first, powered, fluid pressure operated piston and cylinder assembly 100, and a second, individually powered, pressure operated piston and cylinder assembly 102. The second assembly 102, when retained in its normally retracted position, is responsive in the nature of a stiff link to movement of the container box 18 for shifting the spout 44 into and out of its lowered position as the container box 18 is moved into and out of its tilted position.

The first piston and cylinder assembly 100 is connected at one end thereof to the container 18 at pivot point 106, and at the opposite end thereof is pivotally connected to one end 108 of link 86.

The second piston and cylinder assembly 102 is pivotally connected at one end thereof to an ear 110 that extends from the outer end of link 86. The opposite end of the second assembly 102 is pivotally connected to the spout 44 via a lost-motion connection that comprises a slide 112 shiftably mounted on a track 114 extending longitudinally of the spout 44. The track 114 extends between a pair of transverse strength ribs 116, 118 with which the slide 112 is abuttably engagable. The slide 112 thereby comprises a follower that is confined to a path of travel defined by the track 114 and that is limited at its opposite ends of travel by shoulders in the nature of the ribs 116, 118.

OPERATION

During over-the-road travel, the box 18 is stowed in its squared up position of FIG. 3 with the spout 44 swung up against the box 18 closing the exit opening 42 and effectively forming a portion of the side 34. The conveyor 60 simply "folds" in the middle thereof about the hinges 46. It will be noted that with the box 18 in its squared-up position, and due to the rectangular configuration thereof, all available height and width as provided by governmental regulations and restrictions may be utilized in order that the carrying capacity of the box 18 may be maximized.

Figure 6:
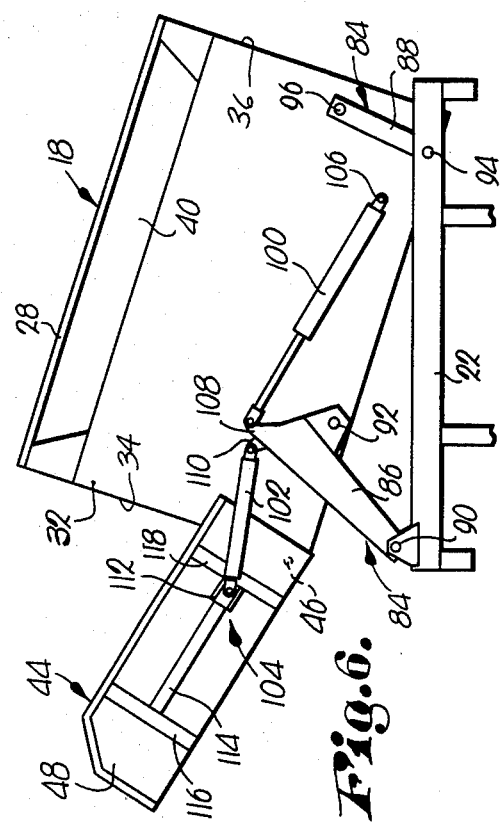
FIG. 6 is a front elevational view of the box in a partially tilted position.

When it is time to begin field operations, the first piston and cylinder assembly 100 associated with each position-control mechanism 98 is extended whereby the box 18 is rotated from its squared up position depicted in FIG. 3 to a partially tilted position as depicted in FIG. 6, and finally to a fully tilted position as depicted in FIG. 7. As will be appreciated by viewing FIG. 3, when the spout 44 is fully raised, the center of gravity thereof is disposed inboard of pivot 46, tending to keep the spout folded up and necessitating an initial pushing action by the assembly 102 to force spout 44 away from the rest of the box 18. In this respect, it will be seen that because the track 114 is oriented at this time with its longitudinal axis transverse to the line of action of assembly 102, when link 86 begins to swing counterclockwise from its FIG. 3 position the slide 112 is not pushed along track 114 toward rib 116 by the stiff assembly 102; instead the spout 48 is swung outwardly about pivot 46.

Then, as the rotating box 18 continues to impart movement to spout 44 through stiff assembly 102, the spout 44 swings overcenter and begins to descend by gravity. However, since the slide 112 is closely adjacent rib 118 at this time, slide 112 becomes firmly abutted against rib 118 as the stiff assembly 102 becomes placed in tension, pulling on spout 44 and thereby permitting it to continue its descent at only a gradual rate as determined by the speed of rotation of the link 86. Such descent continues until stop 51 is engaged (FIG. 2), at which time any additional rotation of the link 86 can be accommodated by the slide 112 slipping along the track 114.

When unloading is appropriate, it is only necessary to actuate the conveyor 60 so as to draw the collected materials up the inclined floors 56 and 58 and out over the upper free end of the spout 44 into the awaiting wagon or truck pulled alongside. Such unloading operation may advantageously be carried out on-the-go while harvesting continues, it then being necessary only to deactivate the conveyor 60 once the truck or wagon has been filled, whereupon the box 18 is used once again to accumulate the crop materials harvested during the interim that the truck or wagon is not available. It is also to be noted that due to the inclined interior surfaces provided by the box 18 when the latter is tilted, complete and thorough unloading thereof can be accomplished inasmuch as the contents tend to gravitate down the steeply inclined interiors of sides 38 and 34 onto some portion of the conveyor 60.

Figure 4:
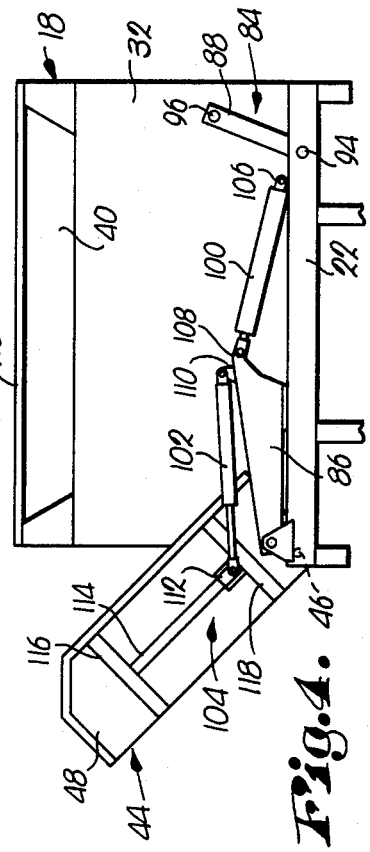
FIG. 4 is similar to FIG. 3 but with the elevator partially extended.
Figure 5:
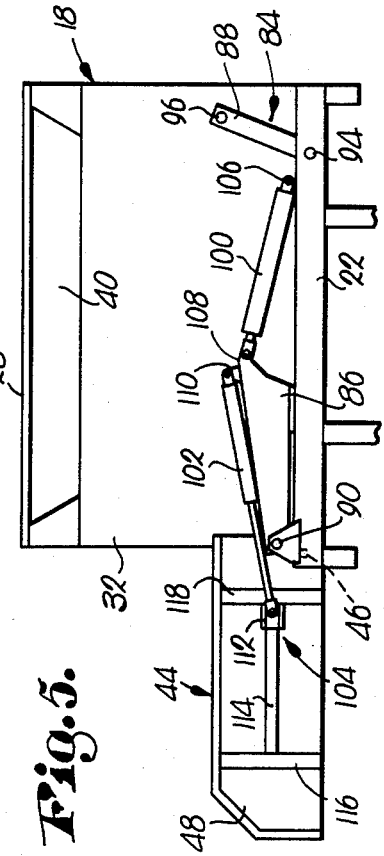
FIG. 5 is similar to FIG. 4 but with the elevator fully extended.

Referring to FIGS. 3-5, it will be apparent that the spout 44 may be lowered independently of the position of the crop container box 18. By first extending assembly 102 to push the spout 44 over center, and then only allowing assembly 102 to extend gradually as slide 112 is pulled up against rib 118, the spout 44 may be lowered into position even though the box 18 remains untilted, for example. Once the spout 44 is in its fully extended position, as depicted in FIG. 5, the first piston and cylinder assembly 100 may be extended, if desired, thereby tilting the box 18 and raising the discharge end of the spout 44. It will be appreciated that motion imparted to link 86 by the extension of the first piston and cylinder assembly 100 will be transferred to the second piston and cylinder assembly 102, but that this motion is accommodated by the shifting of slide 112 along the track 114 of the spout 44.

Figure 2:
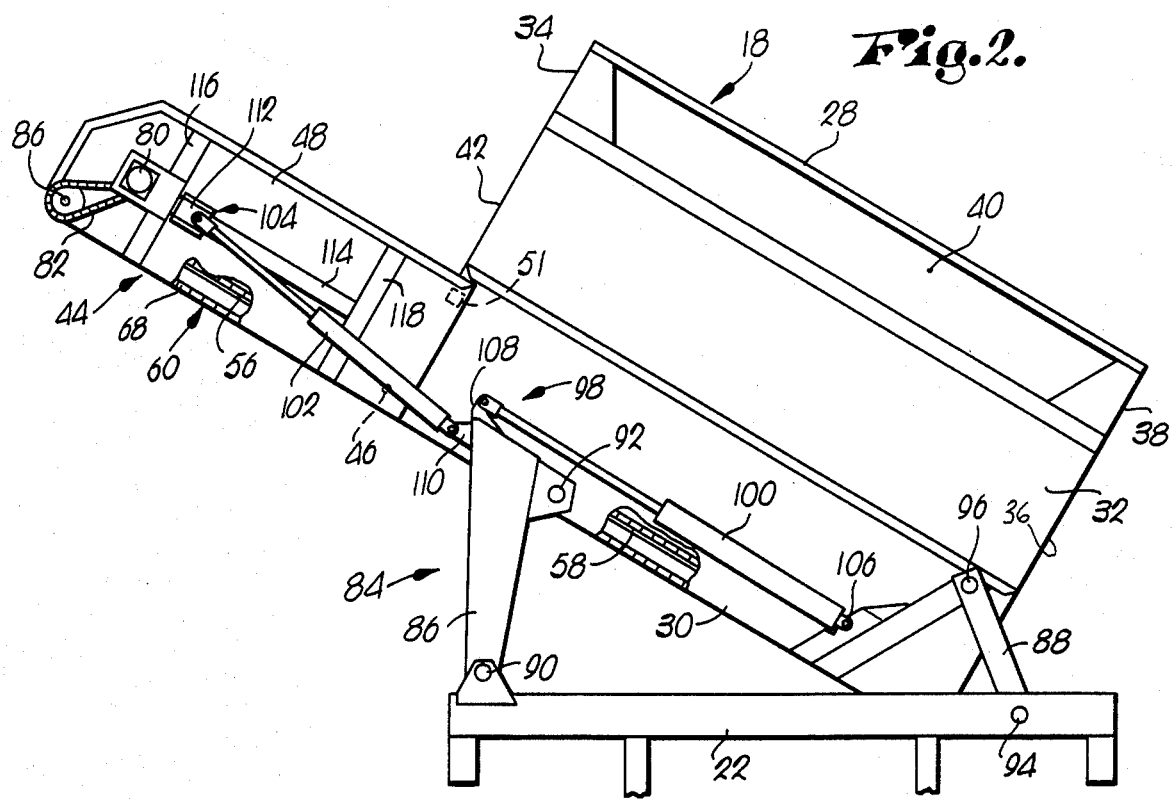
FIG. 2 is a front elevational view thereof on an enlarged scale with the cab portion of the harvester removed and illustrating the box in its tilted, operating position.

FIG. 2 illustrates the position of the second piston and cylinder assembly 102 when extension of the second cylinder 102 has been effected prior to the extension of the first assembly 100. Thus, it will be noted that unloading of the hopper box 18 may commence at any selected position between its lowered position and its fully tilted up position, by first shifting the spout 44 to its fully extended position by the operation of second piston and cylinder assembly 102, and then, if desired, tilting the box 18 through the operation of the first piston and cylinder assembly 100 to the desired inclination.

This flexibility can be especially beneficial for a number of reasons. For example, not all trucks and wagons are of the same height, and it has been found desirable to position the unloading spout 44 as closely above the receiving truck or wagon as possible, giving due consideration to variations in terrain which may be encountered by the truck and relative movements that would necessarily arise between the harvester and the truck. Thus, the deleterious effect of winds can be minimized since the crop materials will have a shorter distance to fall into the awaiting truck, and the truck will simply have a tendency to fill better throughout all portions thereof as the crop being unloaded tends to push and shove the previous crop into the corners of the truck.

When the container box 18 is in the configuration of FIG. 7, (the box fully tilted, spout 44 fully extended, and the second assembly 102 retracted), the slide 112 is located proximal to the shoulder provided by support rib 118. Retraction of the first piston and cylinder assembly 100 to shift the box 18 from its tilted to stowed position will cause the slide 112 to abut the shoulder provided by rib 118, thereby shifting the spout 44 from its lowered to raised position simultaneously with the shifting of the box from its tilted to stowed position. When the container box 18 is in the configuration of FIG. 2, (the box fully tilted, the spout 44 extended, and second piston and cylinder assembly 102 extended), however, the second piston and cylinder assembly 102 must first be retracted to pull the slide 112 up against rib 118, whereupon releveling of the box 18 effects shifting of the spout 44 from the lowered to raised position. Of course, retraction of spout 44 by cylinder 102 may be done after the box 18 is shifted to its stowed position, if desired.

I claim:

1. A vehicle for use in transporting harvested crops comprising:
   a mobile frame;
   a crop container having a top, a bottom, and sides extending between said top and bottom,
   one of said sides having a crop entry opening therein for filling said container with crop material;
   means mounting said container on said frame for movement into and out of a tilted position in which said bottom is sloped generally upwardly and outwardly,
   a second one of said sides having an unloading spout shiftable from a normally raised position in which it serves as a crop confining and containing portion of the container to a lowered position generally aligned with and as an extension of said bottom in which it is disposed for unloading crop from the container;
   power means operably associated with said container for effecting said movement thereof; and
   mechanism responsive to said movement of the container for effecting said shifting of the spout into and out of its lowered position as the container is moved into and out of its tilted position,
   said mechanism including means for selective shifting of said spout independently of the position of said container.

2. A vehicle as claimed in claim 1, said mechanism including a link transmitting the motion of said container to said spout, said link being selectively extendable and retractable independently of said power means for shifting the spout independently of the container.

3. A vechicle as claimed in claim 2, said link comprising a fluid pressure operated device.

4. A vehicle as claimed in claim 2, said link having a pivotal lost motion connection with said spout disposed to transmit operating force between the link and the spout during said shifting of the latter and to take up motion of the container without affecting the spout during movement of the container toward said tilted position with the spout previously lowered, said spout having stop means independent of said link and operable to retain the spout against shifting beyond said lowered position thereof.

5. A vehicle as claimed in claim 4, said lost motion connection including a follower confined to a prescribed path of travel along a track having a shoulder at one end thereof limiting movement of the follower in one direction, said follower abutting said shoulder to dispose the link and spout in force-transmitting relationship during said shifting of the spout and being movable along said track away from said shoulder to dispose the link and the spout out of force-transmitting relationship when the container is moved toward said tilted position with the spout previously lowered.

6. A vehicle as claimed in claim 5, said spout being disposed with said track transverse to the line of action of said link when the spout is fully raised whereby to render the spout initially shiftable by the link away from said raised position notwithstanding the absence of force-transmitting engagement of the follower with the shoulder.

7. A vehicle as claimed in claim 6, said container mounting means including linkage pivotally connected to the frame and the container respectively said link being pivotally connected at one end thereof to said spout.

8. A vehicle as claimed in claim 2, said container mounting means including linkage pivotally connected to the frame and the container respectively, said link being pivotally connected at one end thereof to said spout.

9. A vehicle as claimed in claim 1, said power means comprising a fluid pressure-operated piston and cylinder unit.

* * * * *